United States Patent [19]
Patton et al.

[11] Patent Number: 5,086,898
[45] Date of Patent: Feb. 11, 1992

[54] ROTARY SLIP CLUTCH

[75] Inventors: Robert J. Patton, Lakewood; Adam G. Bay, Chesterland, both of Ohio

[73] Assignee: Gould Inc., Eastalek, Ohio

[21] Appl. No.: 605,676

[22] Filed: Oct. 30, 1990

[51] Int. Cl.⁵ .................... F16D 13/22; F16D 11/04
[52] U.S. Cl. ...................... 192/70.12; 192/70.15; 192/70.25; 192/111 B; 192/107 C
[58] Field of Search ............... 192/70.12, 70.15, 70.25, 192/113 B, 111 B, 70.11, 52, 56 F, 107 C; 464/42, 45

[56] References Cited

U.S. PATENT DOCUMENTS

| | | | |
|---|---|---|---|
| 795,974 | 8/1905 | Hele-Shaw | 192/70.15 |
| 1,132,958 | 3/1915 | Miller | 192/70.12 |
| 1,660,497 | 2/1928 | Treiber | 192/70.15 |
| 1,791,016 | 2/1931 | Sundh | 192/70.12 |
| 1,897,322 | 2/1933 | Montgomery | 464/43 |
| 2,599,292 | 6/1952 | Steinbach | 64/30 |
| 2,738,864 | 3/1956 | Becker | 192/107 C |
| 2,907,428 | 10/1959 | Erwin et al. | 192/70.12 |
| 3,004,411 | 10/1961 | Bugel | 64/29 |
| 3,319,751 | 5/1967 | Sacchini | 192/70.25 |
| 3,648,483 | 3/1972 | Garcia, Jr. | 64/30 |
| 3,659,689 | 5/1972 | Schindel | 192/112 |
| 3,780,538 | 12/1973 | Mann | 64/30 C |
| 4,058,027 | 11/1977 | Webb | 192/107 C X |
| 4,129,204 | 12/1978 | Hedgcock | 192/113 B X |
| 4,249,397 | 2/1981 | Guerra | 64/29 |
| 4,624,650 | 11/1986 | Hiruma et al. | 464/26 |
| 4,667,798 | 5/1987 | Sailer et al. | 192/70.12 |
| 4,802,564 | 2/1989 | Stodt | 192/70.12 X |
| 4,905,812 | 3/1990 | Shepperd | 192/70.12 X |

FOREIGN PATENT DOCUMENTS

| | | | |
|---|---|---|---|
| 59-155630 | 9/1984 | Japan | 192/70.25 |
| 0191820 | 1/1923 | United Kingdom | 192/70.12 |

Primary Examiner—Leslie A. Braun
Assistant Examiner—Andrea Pitts
Attorney, Agent, or Firm—D. Peter Hochberg; Mark Kusner; Louis J. Weisz

[57] ABSTRACT

An adjustable rotary slip clutch comprising a driving portion, a driven portion, an annular cavity defined between the driving portion and the driven portion, a plurality of friction clutch elements of generally conical configuration mounted within the annular cavity, at least one of the friction elements mounted to the driving portion for rotation therewith, an at least one of the friction elements mounted to the driven portion for rotation therewith, and an arrangement for sealing the cavity to maintain lubricant therein.

12 Claims, 3 Drawing Sheets

ROTARY SLIP CLUTCH

FIELD OF THE INVENTION

The invention relates generally to rotary slip clutches, and more particularly to an adjustable, rotary slip clutch suitable for use in relatively low revolution per minute (r.p.m.) applications and which is capable of adjustments over a broad range of torque transmission settings.

BACKGROUND OF THE INVENTION

Adjustable rotary slip clutches are known to be generally comprised of two members, i.e. a driving member and a driven member, which are operable to engage each other at an adjustable pressure such that the driven member follows the driving member by means of friction. When the load on the driven member becomes excessively high, the clutch slips and the driven member comes to a standstill. Such clutches generally include friction pads operable to engage each other along planar surfaces to provide the friction engagement between the two members. Such clutches are typically applicable for transmitting relatively large loads and generally operate at relatively high speed settings.

Such clutches, however, are generally not suitable for applications requiring accurate transmission of very small loads and are not capable of small incremental adjustments. In this respect, the friction elements typically found in such devices are simply not suitable or operable in certain low speed applications where relatively low torque loads are to be transmitted or where the friction contact between the friction elements must be accurately and incrementally adjustable for very low torque loads.

For example, in a copper foil treatment line, a large continuous sheet of metallic foil is conveyed over a plurality of rollers into various treatment baths. Such rollers are generally driven by gears connected to a timing chain to provide a uniform drive along the length of foil. In such a production line, it is critical that the rollers be timed to move in sequence with the foil conveyed thereon, in that the smallest deviations in roller speed relative to the foil speed can produce scratching and scuffing of the metallic foil thereby affecting its quality and value. Even with the most accurate timing chain and gear assemblies, however, successive rollers cannot be precisely timed. In this respect, even the smallest misalignment or misspacing will produce a slight error between the movement of the drive chain and the rotation of the gear and roller, which error accumulates over each revolution of the gear until the gear and roller accelerate or decelerate to correct itself thereby producing a scratch or mark on the foil being conveyed. When it is considered that rollers in a typical foil treatment line may rotate at less than thirty (30) revolutions per minute (r.p.m.), typically 2-20 r.p.m., it becomes apparent that rotary slip clutches known heretofore are not suitable in such low speed, low torque transmission settings.

The present invention overcomes these problems and provides a relatively simple rotary slip clutch which is capable of adjustment between extremely small transmission loads and extremely large transmission loads yet which is adjustable in extremely small increments, especially at low transmission torque settings.

SUMMARY OF THE INVENTION

In accordance with the present invention, there is provided an adjustable rotary slip clutch comprising a driving portion, a driven portion, an annular cavity defined between the driving portion and the driven portion, and friction clutch means mounted within the annular cavity. The friction clutch means include a plurality of annular, conically-shaped hardened metal elements, at least one of which is mounted to the driving portion for rotation therewith, and at least one of which is mounted to the driven portion for rotation therewith. Means for sealing the annular cavity are provided to maintain a lubricant within such cavity and to lubricate the conical elements.

It is an object of the present invention to provide an adjustable, rotary slip clutch of simple and economical construction.

Another object of the present invention is to provide a clutch as described above which is particularly suitable for low torque transmission applications.

Another object of the present invention is to provide a clutch as described above which is particularly suitable for low speed applications.

Another object of the present invention is to provide a clutch as described above wherein the torque transmission characteristic of such clutch is adjustable in extremely small increments.

Another object of the present invention is to provide a clutch as described above including friction elements which are less susceptible to wear and which maintain constant torque transmission characteristics even after prolonged use.

A further object of the present invention is to provide a clutch as described above including friction elements of hardened metal.

A further object of the present invention is to provide a clutch as described above wherein the friction elements are axially adjustable.

A further object of the present invention is to provide a clutch as described above wherein the contact area between the friction elements is adjustable.

A still further object of the present invention is to provide a clutch as described above wherein the hardened metal friction elements are lubricated to reduce friction therebetween.

A still further object of the present invention is to provide an adjustable slip clutch designed for application as part of a roller drive arrangement in a metallic foil processing line.

A still further object of the present invention is to provide a clutch assembly as described above wherein the friction elements are Belleville springs.

These and other objects and advantages will become apparent from the following description of a preferred embodiment taken together with the accompanying drawings.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof and wherein.

DETAILED DESCRIPTION OF THE PREFERRED EMBODIMENT

Figure 1:
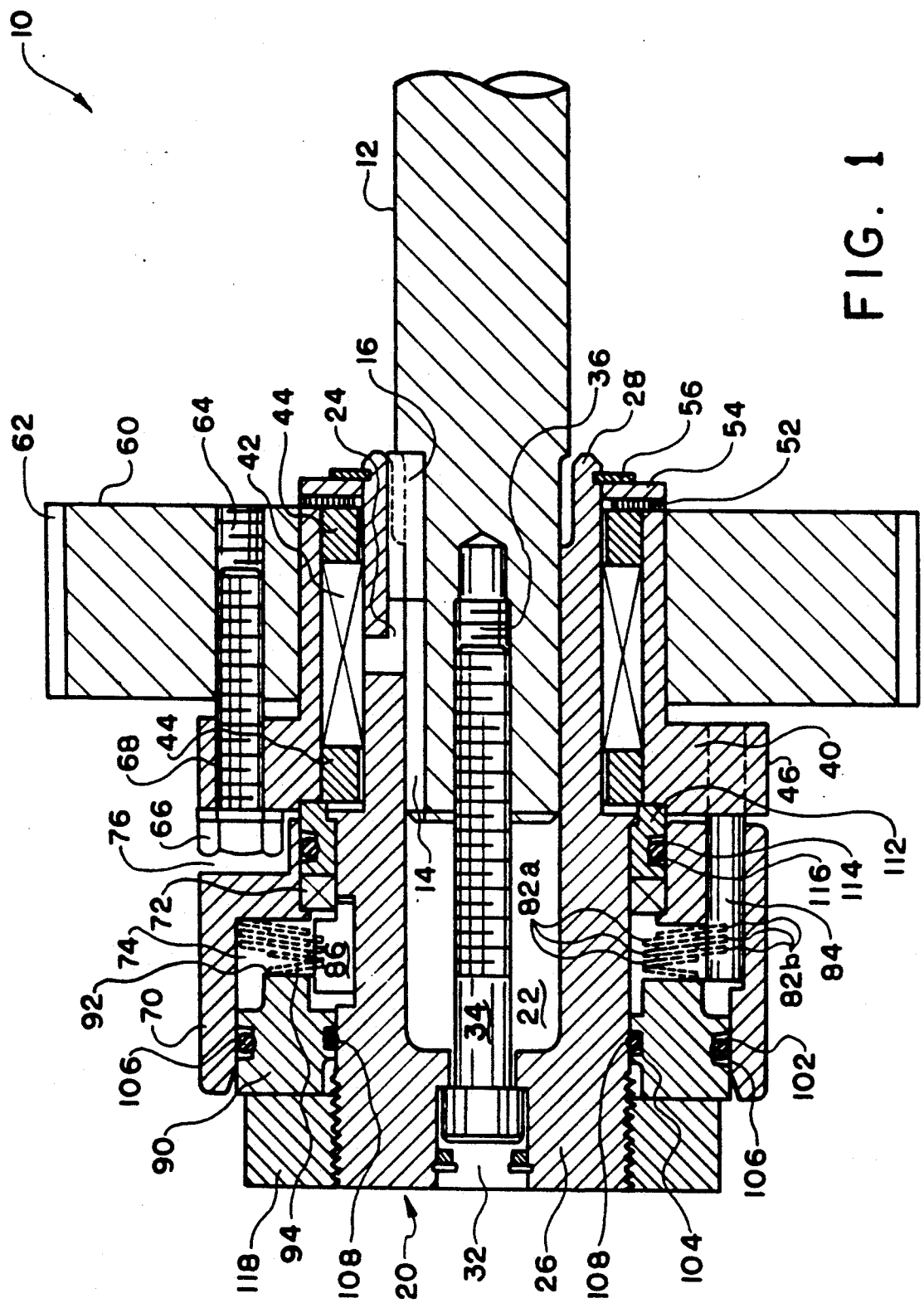
FIG. 1 is a sectional view of an adjustable, rotary slip clutch illustrating a preferred embodiment of the present invention.

Referring now to the drawings wherein the showing are for the purpose of illustrating a preferred embodiment of the invention, and not for the purpose of limiting same, FIG. 1 shows an adjustable rotary slip clutch 10 illustrating a preferred embodiment of the present invention. In the embodiment shown, clutch 10 is adapted to be mounted to a cylindrical shaft 12. Shaft 12 is adapted to be attached to a roller (not shown) as part of a continuous treatment line for metallic foil. Mounted on shaft 12 is an innersleeve 20. Sleeve 20 includes an axially aligned bore 22 which is dimensioned to receive shaft 12 and a keyway 24. Keyway 24 is dimensioned to correspond to a keyway 14 formed in shaft 12. A key 16, dimensioned to be disposed in keyways 14 and 24, is provided to lock innersleeve 20 to shaft 12 for rotation therewith.

Sleeve 20 is generally cylindrical in shape and has a closed, threaded end 26 and an open end 28. Open end 28 is formed to have an outer diameter which is smaller than closed, threaded end 26, as shown in FIG. 1. Closed threaded end 26 of sleeve 20 includes a counterbored opening 32 which is aligned with the axis of shaft 12. Opening 32 is dimensioned to receive an elongated threaded fastener 34, wherein the head of fastener 34 is disposed within the counterbored portion of opening 32. Threaded fastener 34 is dimensioned to be received in a threaded bore 36 formed in the end of shaft 12, such that fastener 34 is operable to adjust a relative position with innersleeve 20 on shaft 12.

Open end 28 of innersleeve 20 is dimensioned to receive a collar 40 thereon. Collar 40 is mounted onto open end 28 on a bearing 42 which is schematically illustrated in FIG. 1. Bearing 42 permits collar 40 to be freely rotatable on innersleeve 20. Annular spacers 44 are disposed on each side of bearing 42. An annular spacer 52, a retaining plate 54, and a snapring 56 are provided to maintain collar 40 on innersleeve 20. Collar 40 is cylindrical in shape and includes a flange 46 at one end thereof. Collar 40 is dimensioned to receive a driving element which, in the embodiment shown, is a sprocket gear 60 having teeth 62. In this respect, in the embodiment shown, gear 60 will be described as a driving element to transmit torque to shaft 12, which at times hereafter will be referred to as the driven element. It will be appreciated from a further reading of the present specification that shaft 12 may be the driving element and gear 60 be the driven element without deviating from the present invention. In a foil treatment line, gear 60 would be one of several gears driven by a timing chain (not shown). To enable the position of gear 60 to be axially adjustable relative to collar 40 and shaft 20, gear 60 includes a threaded opening 64 extending therethrough. Opening 64 is aligned to be parallel to the axis of shaft 12 and is dimensioned to receive a threaded fastener 66 extending through a hole 68 in flange 46 of collar 40. In this respect, gear 60 is preferably mounted on collar 40 to be movable thereon wherein rotation of fastener 66 will cause gear 60 to move along collar 40 and thereby provide means for adjusting the position of gear 60 on collar 40.

Mounted on the closed end portion of innersleeve 20 is a cylindrical housing 70. Housing 70 is mounted on innersleeve 20 on a conventionally-known bearing 72 which is schematically illustrated in FIG. 1. Bearing 72 permits free rotation of housing 70 on innersleeve 20. As shown in FIG. 1, housing 70 is dimensioned to form an annular cavity 74 between itself and innersleeve 20. The end of housing 70 adjacent collar 40 includes a recessed portion 76 operable to receive the head of fastener 66 and to allow wrenching thereof by conventional tools. Disposed within annular cavity 74 is a friction clutch assembly which is generally comprised of a plurality of friction elements generally designated 82 in the drawings. Friction elements 82 are basically flat, annular disks of hardened metal which are conical in shape. According to the present invention, the clutch assembly is basically comprised of an inner set of friction elements designated 82a and an outer set of friction elements designated 82b. As seen in FIG. 1, friction elements 82b are dimensioned to be larger in diameter than friction elements 82a wherein a portion of each friction element 82b overlaps a portion of a corresponding element 82a of the opposite set. Friction elements 82a, 82b are arranged alternatively in annular cavity 74 along the axis of shaft 12. In other words, with the exception of the friction elements 82a, 82b at the end of the stack, an overlapping portion of a friction element 82b is interposed between portions of adjacent friction elements 82a, and an overlapping portion of a friction element 82a is interposed between portions of adjacent friction elements 82b. In addition, according to the present invention, each friction element 82b is interposed between a pair of friction elements 82a.

Each friction element 82b of the outer set includes a cylindrical recess (not shown) dimensioned to receive a cylindrical pin 84. Pin 84 extends through housing 70 into flange 46 of collar 40. In this respect, friction elements 82b are mounted for rotation with housing 70 which, in turn, is connected to gear 60 via collar 46 for rotation therewith. Friction elements 82a include a generally rectangular recess (not shown), dimensioned to receive a key 86 disposed within a keyway 88, formed in innersleeve 20. Friction elements 82a are thus keyed to innersleeve 20 for rotation therewith.

Figure 2:
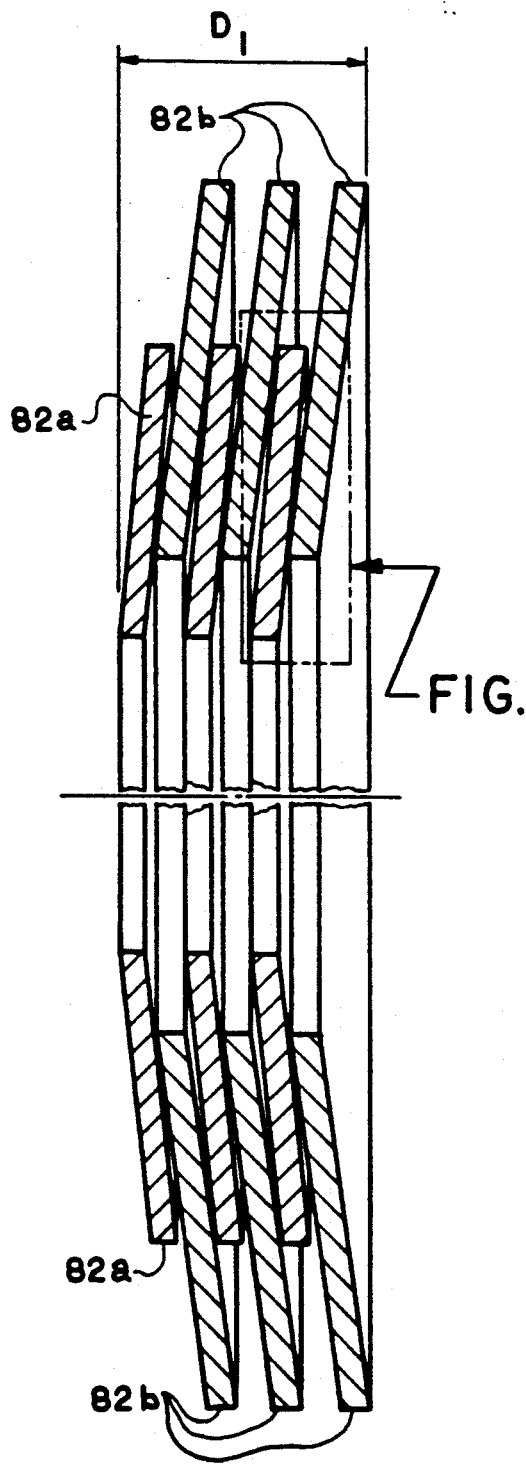
FIG. 2 is an enlarged, sectional view of the friction elements of the clutch shown in FIG. 1 showing such elements in a low torque transmission setting.
Figure 2A:
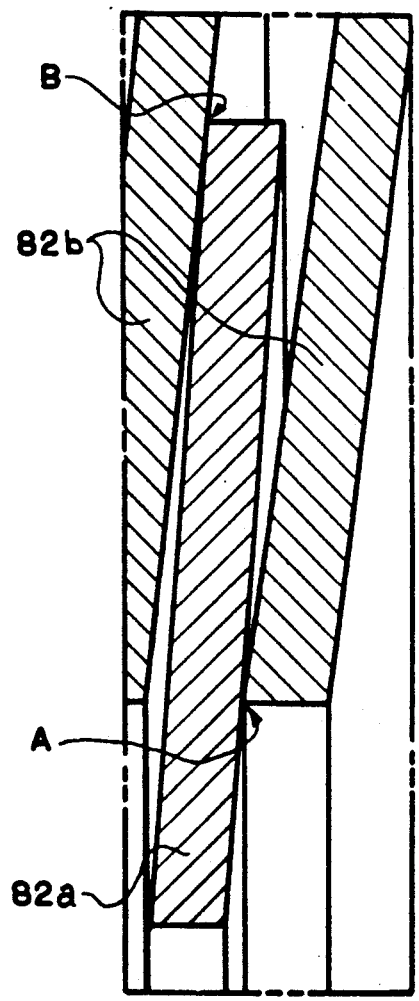
FIG. 2A is an enlarged view of area 2A in FIG. 2.

As indicated above, friction elements 82a, 82b are generally conical disks stacked alternately relative to each other. Importantly, friction elements 82a, 82b have different conical angles, such that, when alternately aligned as shown in the drawings, the respective facing surfaces of friction elements 82a, 82b are not parallel and do not engage along a planar surface. In this respect, FIGS. 2 and 2A shows the typical alignment of friction elements 82a, 82b when in a non-stressed or low stressed condition. In such condition, friction elements 82a, 82b basically engage adjacent elements at specific points, designated "A" and "B" in the drawings, which form circular lines of contact between adjacent conical friction elements 82a, 82b. This non-parallel alignment is important to the operation of the present invention as will be understood from a further reading of the present specification. According to one embodiment of the present invention, friction elements 82a, 82b may be formed from conventionally-known Belleville disk springs, and per the foregoing, friction elements 82a, 82b are formed from two (2) distinct sizes of Belleville springs. The Belleville disks springs are preferably formed of stainless steel.

An adjusting ring 90 is disposed within annular cavity 74 and is dimensioned to be axially movable relative thereto. In this respect, adjusting ring 90 is dimensioned to be slightly smaller than the annular opening defined between housing 70 and innersleeve 20. In other words, a slight gap exists between the inner and outer surfaces of ring 90 and housing 70 and innersleeve 20. Ring 90 includes an annular planar surface 92 facing friction elements 82a, 82b. Disposed between ring 90 and friction elements 82a, 82b is a biasing element 94 operable to maintain a uniform biasing force on friction elements 82a, 82b. Biasing element 94 is preferably a Belleville spring dimensioned to correspond to friction elements 82a.

According to the present invention, annular cavity 74 contains a lubricant, preferably grease, to lubricate the surfaces of friction elements 82a, 82b. To maintain the lubricant within annular cavity 74, a seal is formed thereabout. To this end, grooves 102, 104 are formed in ring 90 to receive O-rings 106, 108 therein. O-rings 106, 108 form a seal between adjusting ring 90 and housing 70 and innersleeve 20. An annular seal holder 112 is provided between bearing 72 and collar 40. Seal holder 112 is dimensioned to be loosely mounted on innersleeve 20 and to have an outer diameter slightly smaller than housing 70 wherein holder 112 is loosely slidable on sleeve 20. A groove 114 is formed in holder 112 to receive an O-ring 116 which seals the upper surface of holder 112 and housing 70.

A conventionally-known split collar is provided to operatively engage the threaded portion of innersleeve 20. Split collar 118 is operable to adjust the position of adjusting ring 90 relative to friction elements 82a, 82b.

Referring now to the operation of device 10, as previously indicated, clutch 10 is adapted for use with components rotating at relatively low speeds of approximately 30 r.p.m. or less, and in the case of a copper foil treatment line, approximately 2-20 r.p.m. where the respective components require relatively low torque transmission. In this respect, in a typical foil line, the weight of the metal foil is almost negligible relative to that of the roller carrying same. In other words, very little transmitted torque is required to convey the metal foil. Consequently, typical slip clutches known heretofore are generally not suitable for such applications. A clutch according to the present invention, however, is particularly applicable to such low speed, low power transmission applications, and provides a clutch mechanism capable of extremely low torque transmission settings.

According to the present invention, split collar 118 is operable to be turned in either a clockwise or a counterclockwise direction on the threaded portion of innersleeve 20 to vary the position of adjusting ring 90 relative to friction elements 82a, 82b. When a desired position is obtained, split collar 118 may be locked onto innersleeve 20 by securing fasteners (not shown) as is conventionally known. By varying the position of split collar 118, and, in turn, the position of adjusting ring 90, the force exerted on friction elements 82a, 82b by biasing element 94 may be varied.

In this respect, at its lowest torque transmission setting, i.e. when adjusting ring 90 is in its furthest-most position to the left, friction elements 82a, 82b of clutch assembly 10 are not forced into contact with each other and are generally spaced apart. In this configuration, little, if any, contact between friction elements 82a, 82b exists, and thus relatively little friction force exists due to the hardened metal forming the respective friction elements. As will be appreciated, the loosely-arranged disks produce relatively little friction resistance due to the insignificant metal-to-metal surface contact of the friction elements 82a, 82b, and more importantly, due to the lubricant provided in annular cavity 74. Accordingly, at its lowest setting, little or no torque is transmitted by clutch 10. Any torque transmission is due primarily to the friction created by the O-rings and the surfaces engaging same, the friction resistance of bearings 42, 72 and the friction effect of the grease within annular cavity 74. The torque transmitted as a result of such friction is thus very small.

If annular ring 90 is positioned to increase the force on friction elements 82a, 82b, the transmitted torque between the driving element and the driven element increases due to the surface contact of friction elements 82a, 82b. Importantly, as indicated above, the surface contact between friction elements 82a, 82b is not a planar surface engaging another planar surface. Rather, at low torque transmission settings, surface-to-surface contact between friction elements 82a, 82b is a line contact along a circular line extending about the axis of the disk-shaped friction elements. In this respect, as indicated above, friction elements 82a, 82b are dissimilar and have generally different conical angles. Accordingly, when aligned along a predetermined axis and compressed to a predetermined length $D_1$, the initial contact between adjacent friction elements 82a, 82b is between the peripheral edge of one (1) friction element and the surface of an adjacent friction element, as illustrated in FIGS. 2 and 2A wherein the initial locations of contact between friction elements 82a, 82b are designated "A" and "B". As will be appreciated, the friction resistance created by such contact is relatively small, again, due to the hardened surfaces of the metal friction elements 82a, 82b and the lubricant therebetween.

Figure 3:
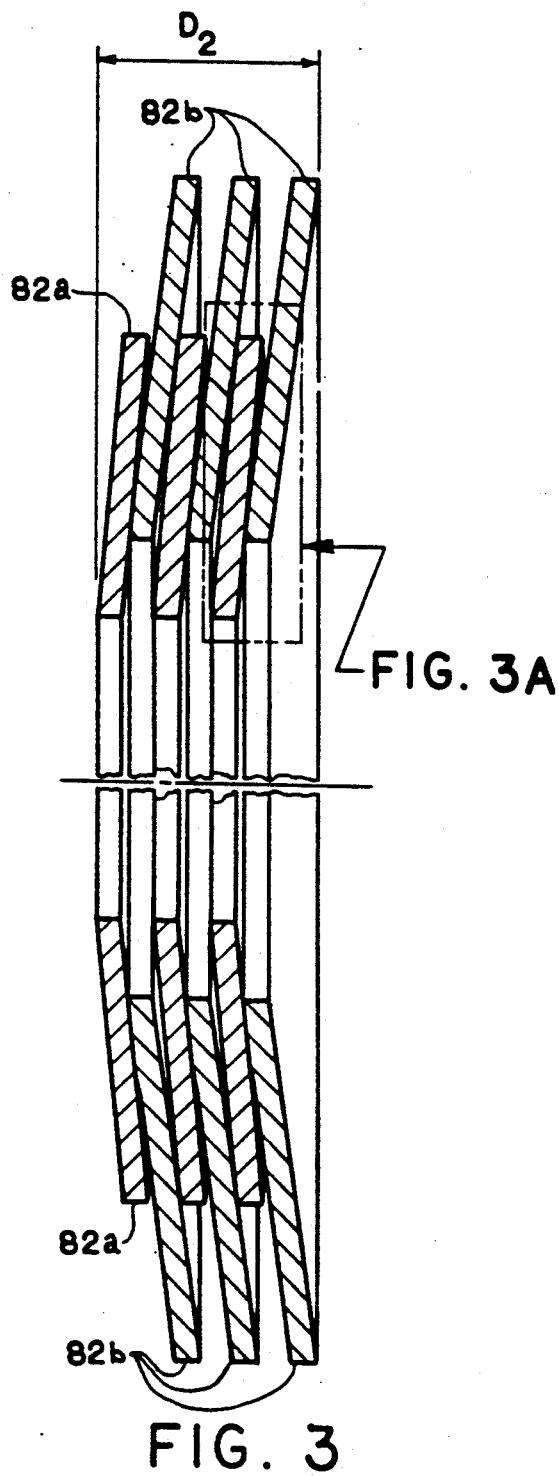
FIG. 3 is a sectional view of friction elements of the adjustable rotary slip clutch shown in FIG. 1 illustrating such elements in a higher torque transmitting setting; and, FIG. 3A is an enlarged view of area 3A in FIG. 3.
Figure 3A:
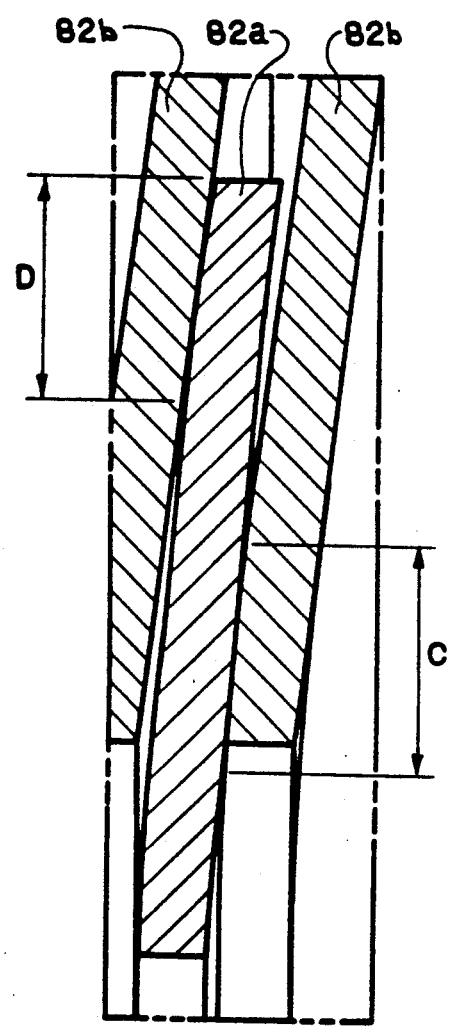

As pressure on friction elements 82a, 82b is increased, by tightening split collar 118 and compressing friction elements 82a, 82b to a length $D_2$ (shorter than $D_1$), friction elements 82a, 82b are pressed into tighter engagement with each other. In this respect, unlike other clutch assemblies where parallel friction plates are squeezed together, according to the present invention, the conical-shaped friction elements 82a, 82b deform, i.e. flatten, when under a compressive force wherein the area of the contacting surfaces increases as the compressive force thereon increases, as best illustrated in FIGS. 3 and 3A wherein the areas of contact between adjacent friction elements 82a, 82b are designated "C" and "D". In this respect, as the clamping or clutching force increases, friction elements 82a, 82b flatten and increase the resultant contacting surface area. Accordingly, as pressure is increased on friction elements 82a, 82b, there is a gradual increase in the contacting friction surface area between such elements and the torque transmitted thereby. Importantly, as will be appreciated, the transmitted torque does not increase rapidly. Although the contacting surface area increases, the hardened metal surfaces of the respective friction elements 82a, 82b resist a rapid build-up of the friction force typically found in plate-like friction elements and devices known heretofore. With the present invention, friction between the respective surfaces of friction elements 82a, 82b does not increase rapidly but does so in relatively small increments due to the metal-to-metal surface contact of friction elements 82a, 82b and the lubricant therebetween. Thus, minor adjustments in the position of annular ring 90 results in small variations in the transmitted torque.

In accordance with another aspect of the present invention, clutch assembly 10 has a self-aligning feature, wherein friction elements 82a, 82b, being conical disks or Belleville springs, tend to realign or reposition themselves to redistribute the axial biasing load equally along each friction element 82a, 82b. This, together with the fact that friction elements 82a, 82b, are free to move axially within annular cavity 74, facilitates equal loading of each friction element 82a, 82b, and provides precise, controllable and incremental increases in the transmitted torque.

As will be seen from the foregoing, a clutch according to the present invention is operable to transmit torque at very low settings or can be adjusted to essentially create a fixed connection between the driving element and the driven element. More importantly, the utilization of hardened, conical elements in a lubricant provides a clutch assembly which can be accurately adjusted in very small, precise increments for use in specialized applications, such as a foil treatment processing line wherein the typical driven shaft speed is in the range of 2–20 r.p.m. In such applications, a correction between the driving element and the driven element of only a few angular degrees may be necessary every several hundred revolutions. A clutch assembly according to the present invention is particularly applicable in that each gear on a drive train can be individually and accurately adjusted to compensate for any slight misspacing or timing error between the chain and the gears. Further, it will be appreciated that in such use, any slippage between the driving portion of the assembly and the driven portion of the assembly would be slight and thus the wear of the friction elements and the O-rings, would be minimal. Thus, the present invention provides a clutch assembly 10 capable of prolonged continuous use in such applications.

Accordingly, the present invention provides a rotary slip clutch 10 for use in generally low speed applications, wherein clutch 10 is capable of a wide of power transmission settings and yet is adjustable in extremely small and precise increments especially at the low end torque transmission.

The present invention has been described with respect to the preferred embodiment. Modifications and alterations will occur to others upon the reading and understanding of the specification. It is intended that all such modifications and alterations be included insofar as they come within the scope of the patent as claimed or the equivalents thereof.

Having thus described the invention, the following is claimed:

1. An adjustable rotary slip clutch comprising:
 a shaft;
 a first rotary member rotatably mounted relative to said shaft concentric with said shaft;
 a second rotary member mounted to said shaft for rotation therewith;
 sleeve means rotatably mounted concentrically relative to said shaft defining an annular cavity;
 friction clutch means within said annular cavity including a plurality of hardened, elastically deformable metal elements, each of said metal elements having a generally conical shape wherein the surface on one side of said element is generally parallel to the surface on the other side of said element, at least one of said metal elements being connected to said first rotary member for rotation therewith and at least one of said metal elements being mounted to said second rotary member for rotation therewith wherein a portion of said element connected to said first rotary member overlaps a portion of said element connected to said second rotary member for continuous engagement therewith;
 selectively positionable adjustment means operable to increase or decrease incrementally the axial force acting on said metal elements;
 lubrication means in said annular cavity surrounding said metal elements; and,
 means for sealing said annular cavity to retain said lubrication means therein.

2. A clutch as defined in claim 1 wherein said second rotary member is axially movable along said shaft.

3. A clutch as defined in claim 1 wherein said metal elements are Belleville springs.

4. A clutch as defined in claim 1 wherein said lubrication means is a grease disposed within said cavity to lubricate the surfaces of said metal elements.

5. An adjustable rotary slip clutch comprising;
 a driving portion;
 a driven portion;
 an annular cavity defined between said driving portion and said driven portion;
 friction clutch means mounted within said annular cavity including a plurality of stacked, hardened Belleville springs, at a least one of said Belleville springs mounted to said driving portion for rotation therewith, and at least one of said Belleville springs mounted to said driven portion for rotation therewith, said Belleville spring on said driving portion positionable to be in continuous surface contact with said Belleville springs on said driven portion;
 lubrication means within said cavity surrounding said springs; and,
 means for sealing said cavity to maintain said lubrication means therein.

6. A clutch as defined in claim 5 further comprising adjustment means operable to increase or decrease the axial force acting on said springs.

7. An adjustable rotary slip clutch comprising:
 a shaft;
 a driving element rotatably mounted relative to said shaft about said shaft;
 a driven element mounted to said shaft;
 a sleeve operatively connected to said driving element for rotation therewith, said sleeve and said driven element defining an annular cavity therebetween;
 friction clutch means mounted within said annular cavity, said clutch means comprised of a first and second sets annular, conically-shaped disks of hardened metal, said disks dimensioned to be positioned concentric to said shaft within said annular cavity with at least one of said disks from said first set being connected to said sleeve for rotation therewith and at least one of said disk from said second set mounted to said driven element for rotation therewith said first set of disks having a conical shape different from said second set of disks;
 an annular ring disposed within said annular cavity operable to engage said disks, said annular ring being selectively positionable to increase or decrease incrementally the axial force acting on said disks; and, means for sealing said annular cavity, and a lubricant within said annular cavity to lubricate said disks.

8. A clutch as defined in claim 7 wherein said disks are Belleville springs.

9. An adjustable rotary slip clutch comprising:

a driving portion;

a driven portion;

an annular cavity defined between said driving portion and said driven portion;

a first set and a second set of elastically deformable metal, generally conical clutch elements disposed within said annular cavity, said clutch elements of said second set being larger than said clutch elements of said first set and having a conical angle different from said first set, one of said first and second sets mounted to said driving portion for rotation therewith and the other of said first second sets mounted to said driven portion for rotation therewith, said set arranged with elements from each said set interposed with elements from said other set; and, selectively positional adjustment means operable to increase or decrease incrementally the axial force on said element, an increase in said axial force tending to deform said elements and increase a continuous contacting surface area between said clutch elements.

10. A clutch as defined in claim 9 wherein said adjustment means is an annular ring axially movable within said annular cavity.

11. A clutch as defined in claim 9 further comprising means for sealing said annular cavity to retain a lubricant therein.

12. A clutch as defined in claims 10 or 11 wherein said friction elements are Belleville springs.

* * * * *